United States Patent
Yao et al.

(10) Patent No.: US 7,295,561 B1
(45) Date of Patent: Nov. 13, 2007

(54) FIBRE CHANNEL IMPLEMENTATION USING NETWORK PROCESSORS

(75) Inventors: Hawkins Yao, San Jose, CA (US); Richard Gunlock, Houston, TX (US); Po-Wei Tan, San Jose, CA (US)

(73) Assignee: CipherMax, Inc., Houston, TX (US)

( * ) Notice: Subject to any disclaimer, the term of this patent is extended or adjusted under 35 U.S.C. 154(b) by 792 days.

(21) Appl. No.: 10/117,638

(22) Filed: Apr. 5, 2002

(51) Int. Cl.
*H04L 12/28* (2006.01)
*H04L 12/66* (2006.01)

(52) U.S. Cl. ............... 370/400; 370/412; 370/428; 709/238

(58) Field of Classification Search ........... 370/389, 370/392, 412, 471, 413, 402, 428, 400, 401; 709/238
See application file for complete search history.

(56) References Cited

U.S. PATENT DOCUMENTS

| | | | |
|---|---|---|---|
| 4,755,930 A | 7/1988 | Wilson, Jr. et al. | 364/200 |
| 5,140,682 A | 8/1992 | Okura et al. | 395/425 |
| 5,247,649 A | 9/1993 | Bandoh | 395/425 |
| 5,394,556 A | 2/1995 | Oprescu | 395/800 |
| 5,515,376 A | 5/1996 | Murthy et al. | 370/85.13 |
| 5,530,832 A | 6/1996 | So et al. | 395/449 |
| 5,602,841 A | 2/1997 | Lebizay et al. | |
| 5,606,669 A | 2/1997 | Bertin et al. | 395/200.2 |
| 5,611,049 A | 3/1997 | Pitts | 395/200.09 |
| 5,699,548 A | 12/1997 | Choudhury et al. | 395/469 |
| 5,778,429 A | 7/1998 | Sukegawa et al. | 711/129 |
| 5,835,756 A | 11/1998 | Caccavale | 395/601 |
| 5,835,943 A | 11/1998 | Yohe et al. | 711/118 |
| 5,845,280 A | 12/1998 | Treadwell, III et al. | 707/8 |
| 5,845,324 A | 12/1998 | White et al. | 711/128 |
| 5,852,717 A | 12/1998 | Bhide et al. | 395/200.33 |
| 5,864,854 A | 1/1999 | Boyle | 707/10 |
| 5,873,100 A | 2/1999 | Adams et al. | 707/204 |
| 5,878,218 A | 3/1999 | Maddalozzo, Jr. et al. | 395/200.43 |
| 5,881,229 A | 3/1999 | Singh et al. | 395/200.33 |
| 5,918,244 A | 6/1999 | Percival | 711/119 |
| 5,930,253 A | 7/1999 | Brueckheimer et al. | 370/395 |
| 5,933,849 A | 8/1999 | Srbljic et al. | 711/118 |
| 5,944,780 A | 8/1999 | Chase et al. | 709/201 |
| 5,944,789 A | 8/1999 | Tzelnic et al. | 709/214 |
| 5,978,841 A | 11/1999 | Berger | 709/217 |
| 5,978,951 A | 11/1999 | Lawler et al. | 714/758 |
| 5,987,223 A | 11/1999 | Narukawa et al. | 395/109 |
| 5,991,810 A | 11/1999 | Shapiro et al. | 709/229 |
| 6,041,058 A | 3/2000 | Flanders et al. | 370/401 |
| 6,044,406 A | 3/2000 | Barkey et al. | 709/235 |
| 6,081,883 A | 6/2000 | Popelka et al. | 712/28 |

(Continued)

OTHER PUBLICATIONS

"Microsoft Computer Dictionary: Fifth Edition"; Microsoft Press; pp. 3.

(Continued)

*Primary Examiner*—Joseph Feild
*Assistant Examiner*—Inder Pal Mehra
(74) *Attorney, Agent, or Firm*—Baker Botts L.L.P.

(57) ABSTRACT

Network processors controlled by software are used to implement the FC-1 and FC-2 layer functions. Each Network Processor comprises a fabric processor, an executive processor, channel processors and associated serial data processors. Special ASICs are not required since all of the Fiber Channel layers may be implementation with the network processors under software control.

24 Claims, 12 Drawing Sheets

U.S. PATENT DOCUMENTS

| | | | |
|---|---|---|---|
| 6,085,234 A | 7/2000 | Pitts et al. | 709/217 |
| 6,098,096 A | 8/2000 | Tsirigotis et al. | 709/213 |
| 6,105,062 A | 8/2000 | Andrews et al. | 709/223 |
| 6,128,306 A | 10/2000 | Simpson et al. | 370/412 |
| 6,138,209 A | 10/2000 | Krolak et al. | 711/128 |
| 6,147,976 A | 11/2000 | Shand et al. | 370/254 |
| 6,243,358 B1 | 6/2001 | Monin | 370/229 |
| 6,252,514 B1 | 6/2001 | Nolan et al. | 340/686.4 |
| 6,289,386 B1 | 9/2001 | Vangemert | 709/232 |
| 6,361,343 B1 | 3/2002 | Daskalakis et al. | 439/327 |
| 6,400,730 B1 | 6/2002 | Latif et al. | 370/466 |
| 6,424,657 B1 | 7/2002 | Voit et al. | 370/412 |
| 6,457,048 B2 | 9/2002 | Sondur et al. | 709/220 |
| 6,470,013 B1 | 10/2002 | Barach et al. | 370/392 |
| 6,484,209 B1 | 11/2002 | Momirov | 709/238 |
| 6,532,501 B1 | 3/2003 | McCracken | 710/52 |
| 6,584,101 B2 | 6/2003 | Hagglund et al. | 370/389 |
| 6,594,701 B1 | 7/2003 | Forin | 709/232 |
| 6,597,689 B1 | 7/2003 | Chiu et al. | 370/354 |
| 6,597,699 B1 | 7/2003 | Ayres | 370/400 |
| 6,601,186 B1 | 7/2003 | Fox et al. | 714/4 |
| 6,615,271 B1 | 9/2003 | Lauck et al. | 709/232 |
| 6,654,895 B1 | 11/2003 | Henkhaus et al. | 713/320 |
| 6,657,962 B1 | 12/2003 | Barri et al. | 370/235 |
| 6,687,247 B1* | 2/2004 | Wilford et al. | 370/392 |
| 6,704,318 B1 | 3/2004 | Stuart et al. | 370/403 |
| 6,721,818 B1 | 4/2004 | Nakamura | 710/9 |
| 6,731,644 B1 | 5/2004 | Epps et al. | 370/412 |
| 6,731,832 B2 | 5/2004 | Alvarez et al. | 385/16 |
| 6,735,174 B1 | 5/2004 | Hefty et al. | 370/235 |
| 6,747,949 B1 | 6/2004 | Futral | 370/231 |
| 6,754,206 B1 | 6/2004 | Nattkemper et al. | 370/369 |
| 6,757,791 B1 | 6/2004 | O'Grady et al. | 711/154 |
| 6,758,241 B1 | 7/2004 | Pfund et al. | 137/596 |
| 6,762,995 B1 | 7/2004 | Drummond-Murray et al. | 370/229 |
| 6,765,871 B1 | 7/2004 | Knoebel et al. | 370/231 |
| 6,765,919 B1 | 7/2004 | Banks et al. | 370/401 |
| 6,792,507 B2 | 9/2004 | Chiou et al. | 711/119 |
| 6,822,957 B1 | 11/2004 | Schuster et al. | 370/389 |
| 6,839,750 B1 | 1/2005 | Bauer et al. | 709/223 |
| 6,847,647 B1 | 1/2005 | Wrenn | 370/395.32 |
| 6,876,668 B1 | 4/2005 | Chawla et al. | 370/468 |
| 6,879,559 B1 | 4/2005 | Blackmon et al. | 370/225 |
| 6,889,245 B2 | 5/2005 | Taylor et al. | 709/203 |
| 6,973,229 B1 | 12/2005 | Tzathas et al. | 385/16 |
| 7,010,715 B2 | 3/2006 | Barbas et al. | 714/4 |
| 7,013,084 B2 | 3/2006 | Battou et al. | 398/45 |
| 7,035,212 B1 | 4/2006 | Mittal et al. | 370/230 |
| 7,079,485 B1 | 7/2006 | Lau et al. | 370/229 |
| 7,190,695 B2 | 3/2007 | Schaub et al. | 370/392 |
| 2001/0023443 A1 | 9/2001 | Fichou et al. | 709/227 |
| 2001/0037435 A1 | 11/2001 | Van Doren | 711/153 |
| 2001/0043564 A1 | 11/2001 | Bloch et al. | 370/230 |
| 2002/0004842 A1 | 1/2002 | Ghose et al. | 709/235 |
| 2002/0010790 A1 | 1/2002 | Ellis et al. | 709/238 |
| 2002/0012344 A1 | 1/2002 | Johnson et al. | 370/389 |
| 2002/0024953 A1 | 2/2002 | Davis et al. | 370/395.1 |
| 2002/0071439 A1 | 6/2002 | Reeves et al. | 370/400 |
| 2002/0078299 A1 | 6/2002 | Chiou et al. | 711/119 |
| 2002/0103921 A1 | 8/2002 | Nair et al. | 709/232 |
| 2002/0186703 A1 | 12/2002 | West et al. | 370/413 |
| 2002/0188786 A1 | 12/2002 | Barrow et al. | 710/300 |
| 2003/0002506 A1 | 1/2003 | Moriwaki et al. | 370/392 |
| 2003/0012204 A1* | 1/2003 | Czeiger et al. | 370/401 |
| 2003/0014540 A1 | 1/2003 | Sultan et al. | 709/240 |
| 2003/0037177 A1 | 2/2003 | Sutton et al. | 709/316 |
| 2003/0048792 A1* | 3/2003 | Xu et al. | 370/400 |
| 2003/0063348 A1 | 4/2003 | Posey, Jr. | 359/139 |
| 2003/0074449 A1 | 4/2003 | Smith et al. | 709/226 |
| 2003/0084219 A1 | 5/2003 | Yao et al. | 710/300 |
| 2003/0093541 A1 | 5/2003 | Lolayekar et al. | 709/230 |
| 2003/0093567 A1 | 5/2003 | Lolayekar et al. | 709/246 |
| 2003/0126223 A1 | 7/2003 | Jenne et al. | 709/212 |
| 2003/0126280 A1 | 7/2003 | Hawkins et al. | 709/234 |
| 2003/0126297 A1 | 7/2003 | Olarig et al. | 709/250 |
| 2003/0128703 A1 | 7/2003 | Zhao et al. | 370/392 |
| 2003/0154301 A1 | 8/2003 | McEachern et al. | 709/237 |
| 2003/0163555 A1 | 8/2003 | Battou et al. | 709/223 |
| 2003/0195956 A1 | 10/2003 | Bramhall et al. | 709/223 |
| 2003/0198231 A1 | 10/2003 | Kalkunte et al. | 370/395.31 |
| 2003/0202520 A1 | 10/2003 | Witkowski et al. | 370/400 |
| 2005/0018619 A1 | 1/2005 | Banks et al. | 370/254 |
| 2005/0018709 A1 | 1/2005 | Barrow et al. | 370/465 |
| 2005/0044354 A1* | 2/2005 | Hagerman | 713/160 |
| 2005/0243734 A1 | 11/2005 | Nemlrovsky et al. | 370/252 |

OTHER PUBLICATIONS

PCT International Search Report PCT/US01/47769, 3 pages, mailing date Apr. 23, 2002.

U.S. Appl. No. 10/117,040 entitled "System and Method for Expansion of Computer Network Switching System Without Disruption Thereof," filed Apr. 5, 2002 by Mark Oelke et al.

U.S. Appl. No. 10/117,266 entitled "System and Method for Guaranteed Link Layer Flow Control," filed Apr. 5, 2002 by Hani Ajus et al.

U.S. Appl. No. 10/117,290 entitled "Method and System for Reduced Distributed Event Handling in a Network Environment," filed Apr. 5, 2002 by Huang Ruotao et al.

U.S. Appl. No. 10/117,418 entitled "System and Method for Linking a Plurality of Network Switches," filed Apr. 5, 2002 by Ram Iyer et al.

Mary Baker et al., "The Recovery Box: Using Fast Recovery to Provide High Availability in the UNIX Environment," *Summer '92 USENIX* (pp. 31-43), Jun. 8, 1992.

George Candea et al., "Microreboot—A Technique for Cheap Recovery," *Computer Systems Lab*, Stanford University, http://swig.stanford.edu/~candea/papers/microreboot/html/index.html (31 pages), Dec. 1, 2004.

* cited by examiner

FIBRE CHANNEL IMPLEMENTATION USING NETWORK PROCESSORS

CROSS-REFERENCE TO RELATED APPLICATIONS

This application is related to U.S. patent application Ser. No. 09/738,960, entitled "Caching System and Method for a Network Storage System" by Lin-Sheng Chiou, Mike Witkowski, Hawkins Yao, Cheh-Suei Yang, and Sompong Paul Olarig, which was filed on Dec. 14, 2000 and which is incorporated herein by reference in its entirety for all purposes; U.S. patent application Ser. No. 10/015,047 entitled "System, Apparatus and Method for Address Forwarding for a Computer Network" by Hawkins Yao, Cheh-Suei Yang, Richard Gunlock, Michael L. Witkowski, and Sompong Paul Olarig, which was filed on Oct. 26, 2001 and which is incorporated herein by reference in its entirety for all purposes; U.S. patent application Ser. No. 10/039,190 entitled "Network Processor Interface System" by Sompong Paul Olarig, Mark Lyndon Oelke, and John E. Jenne, which was filed on Dec. 31, 2001, and which is incorporated herein by reference in its entirety for all purposes; U.S. patent application Ser. No. 10/039,189 entitled "Xon/Xoff Flow Control for Computer Network" by Hawkins Yao, John E. Jenne, and Mark Lyndon Oelke, which was filed on Dec. 31, 2001, and which is incorporated herein by reference in its entirety for all purposes; and U.S. patent application Ser. No. 10/039,184 entitled "Buffer to Buffer Flow Control for Computer Network" by John E. Jenne, Mark Lyndon Oelke and Sompong Paul Olarig, which was filed on Dec. 31, 2001, and which is incorporated herein by reference in its entirety for all purposes. This application is also related to the following four U.S. patent applications which are being filed concurrently: U.S. patent application Ser. No. 10/117,418, entitled "System and Method for Linking a Plurality of Network Switches," by Ram Ganesan Iyer, Hawkins Yao and Michael Witkowski, which was filed on Apr. 5, 2002, and which is incorporated herein by reference in its entirety for all purposes; U.S. patent application Ser. No. 10/117,040, entitled "System and Method for Expansion of Computer Network Switching System Without Disruption Thereof," by Mark Lyndon Oelke, John E. Jenne, Sompong Paul Olarig, Gary Benedict Kotzur and Matthew John Schumacher, which was filed on Apr. 5, 2002, and which is incorporated herein by reference in its entirety for all purposes; U.S. patent application Ser. No. 10/117,266, entitled "System and Method for Guaranteed Link Layer Flow Control," by Hani Ajus and Chung Dai, which was filed on Apr. 5, 2002, and which is incorporated herein by reference in its entirety for all purposes; U.S. patent application Ser. No. 10/117,290, entitled "Method and System for Reduced Distributed Event Handling in a Network Environment," by Ruotao Huang and Ram Ganesan Iyer, which was filed on Apr. 5, 2002, and which is incorporated herein by reference in its entirety for all purposes.

FIELD OF THE INVENTION

The present invention is related to computer networks. More specifically, the present invention is related to providing Fibre Channel protocol functions using network processors.

BACKGROUND OF THE INVENTION TECHNOLOGY

The design of networking products has undergone continuous evolution as the speed and functionality of local and wide-area networks have grown. In the early days of packet-based networking, networking devices (such as bridges and routers) were built with a combination of general purpose central processing units (CPUs), discrete logic, and Application Specific Standard Products (ASSPs), including interface controllers and transceivers. The software-based nature of these devices was key to adapting to new protocol standards and the additional functionality required by networks, such as the early Internet. Although these designs were large, complex, and comparatively slow, they met the needs of these early networks, e.g., Ethernet or Token Ring connections.

Over time, as network interface speeds and densities increased, the performance of general-purpose processors fell short of what was needed. This led network vendors to develop simpler, fixed function devices, e.g., Layer 2 Ethernet switches, that could be built with Application Specific Integrated Circuits (ASICs). ASICs traded-off the programmability of software-based designs for hardware-based speed. As ASIC technology progressed, more and more functionality was incorporated into the hardware. This was made possible by protocol consolidation around IP and Ethernet as the dominant enterprise network technology, which reduced the need for product flexibility.

New protocols have developed, e.g., Fibre Channel, ATM/SONET, Gigabit Ethernet, and the like. These protocols have traditionally been implemented with an ASIC and a software layer running on a general-purpose microprocessor. In this traditional implementation, the Fibre Channel ASIC handles all FC-1 layer functions with hardware assists for some FC-2 layer sequence/exchange management.

However, design flexibility without hardware changes are difficult when using ASICs. What is needed is a way of implementing Fibre Channel protocol using a system architecture which is more flexible so as to allow software to be easily adapted to support any upper and lower layer protocols without having the constraint of changing hardware (ASIC) design.

SUMMARY OF THE INVENTION

The invention overcomes the above-identified problems as well as other shortcomings and deficiencies of existing technologies by providing a system architecture comprising network processors and software running the network processors which may be easily adapted for supporting any Fibre Channel upper and lower layer protocols without hardware changes.

The present invention is directed to a method for providing Fibre Channel ingress data flow with network processors by receiving a frame from a network. Moving the frame into a buffer memory. Parsing the frame header. Decoding addresses in the frame header. Performing a cyclic redundancy check on the frame for detecting transmission errors. Performing a table lookup for determining a destination port. Creating a frame descriptor having a data structure describing where the frame is stored in the buffer memory and to what egress port number the frame is to be sent. Imbedding the destination port into the frame descriptor. Queuing the frame descriptor for transmission to a fabric processor. And forwarding cells of the frame to a switch fabric interface bridge. According to the invention, receiving a frame also may comprise receiving a frame at an ingress port of an ingress network processor, the ingress port being coupled to the network. The fabric processor may be associated with the ingress network processor. The buffer memory may be coupled to the ingress network processor. The ingress network processor may also be a plurality of ingress network processors. The plurality of ingress network processors may be arranged in a cluster for sharing operational activities. Sharing operational activities may include pipelining of operational activities.

The present invention is also directed to a method for providing Fibre Channel egress data flow with network processors by receiving cells of a frame from a switch fabric interface bridge. Reassembling the frame from the received cells and storing the frame in a buffer memory, wherein when a first cell of the frame is received a frame descriptor is allocated for keeping track of the frame location in the buffer memory. Determining which port to send the frame upon receiving a start of frame cell. Queuing the frame for transmission when an end of frame cell is received. And transmitting the frame from the port. According to the invention, reassembling the frame from the received cells also may comprise reassembling the frame with an egress fabric processor associated with an egress network processor. The buffer memory may be coupled to the egress network processor. Queuing the frame for transmission may be done with the egress fabric processor. The egress network processor may be a plurality of egress network processors. The plurality of egress network processors may be arranged in a cluster for sharing operational activities. Sharing operational activities may include pipelining the operational activities.

The present invention is also directed to a method for providing Fibre Channel ingress control flow with network processors by (a) receiving a frame from a network; (b) moving the frame into a buffer memory; (c) parsing the frame header; (d) decoding addresses in the frame header; (e) performing a cyclic redundancy check on the frame for detecting transmission errors; (f) performing a table lookup for determining a destination port; (g) creating a frame descriptor having a data structure describing where the frame is stored in the buffer memory and to what egress port number the frame is to be sent; (h) queuing the frame descriptor for sending to a line card processor; (i) processing the frame, wherein, if the frame is valid, then queuing the frame for transmission to the line card processor and then going to (j) below, if not, then sending a negative-acknowledge character or dropping the frame, and then terminating ingress control flow for that frame; (j) moving the frame data to a local memory of the line card processor; and (k) notifying the line card processor that the frame is in the line card processor local memory. Receiving a frame may comprise receiving the frame at an ingress port of an ingress network processor, the ingress port being coupled to the network. Queuing the frame descriptor may be queuing the frame descriptor to an executive processor associated with the ingress network processor. Processing the frame may be done with the executive processor. Moving the frame data may be done with the executive processor. The ingress network processor may be a plurality of ingress network processors. The plurality of ingress network processors may be arranged in a cluster for sharing operational activities. Sharing operational activities may include pipelining the operational activities.

The present invention is also directed to a method for providing Fibre Channel egress control flow with network processors by notifying an egress network processor to send a frame. Transferring the frame into a memory of the egress network processor. Formatting the frame. Determining an egress port for transmission of the frame. Queuing the frame for transmission from the egress port. And transmitting the frame from the egress port to a destination. Queuing the frame for transmission from the egress port may comprise receiving the frame with an executive processor associated with the egress network processor, formatting the frame with the executive processor, determining with the executive processor which egress port to use for transmitting the frame, and queuing the frame with the executive processor for transmitting the frame from the egress port. The egress network processor may be a plurality of egress network processors. The plurality of egress network processors may be arranged in a cluster for sharing operational activities. Sharing operational activities may include pipelining the operational activities.

The present invention is also directed to a method for providing Fibre Channel data flow with network processors by receiving a frame from a network with a first network processor. Moving the frame into a first buffer memory coupled to the first network processor. Parsing the frame header with the first network processor. Decoding addresses in the frame header with the first network processor. Performing a cyclic redundancy check on the frame for detecting transmission errors with the first network processor. Performing a table lookup for determining a destination port with the first network processor. Creating a frame descriptor with the first network processor, the frame descriptor having a data structure describing where the frame is stored in the first buffer memory and to what egress port number the frame is to be sent Imbedding the destination port into the frame descriptor. Queuing the frame descriptor for transmission to a fabric processor associated with the first network processor. Forwarding cells of the frame to a switch fabric interface bridge with the first network processor. Receiving cells of the frame from the switch fabric interface bridge with a second network processor. Reassembling the frame from the received cells with the second network processor and storing the frame in a second buffer memory coupled to the second network processor, wherein when a first cell of the frame is received a frame descriptor is allocated for keeping track of the frame location in the second buffer memory. Determining with the second network processor which port to send the frame upon receiving a start of frame cell. Queuing the frame for transmission with the second network processor when an end of frame cell is received by the second network processor. And transmitting the frame with the second network processor from an egress port.

The present invention is also directed to a method for providing Fibre Channel control flow with network processors by (a) receiving a frame from a network with a first network processor, (b) moving the frame into a buffer memory coupled to the first network processor, (c) parsing the frame header with the first network processor, (d) decoding addresses in the frame header with the first network processor, (e) performing a cyclic redundancy check with the first network processor on the frame for detecting transmission errors, (f) performing a table lookup with the first network processor for determining a destination port; (g) creating a frame descriptor with the first network processor, the frame descriptor having a data structure describing where the frame is stored in the first buffer memory and to what egress port number the frame is to be sent, (h) queuing the frame descriptor for sending to a line card processor, (i) processing the frame, wherein, if the frame is valid, then queuing the frame for transmission to the line card processor and then going to (j) below, if not, then sending a negative-acknowledge character or dropping the frame, and then terminating ingress control flow for that frame, (l) moving the frame data to a local memory of the line card processor, (k) notifying the line card processor with the first network processor that the frame is in the line card processor local memory, (l) notifying a second network processor to send the frame, (m) transferring the frame into a local memory of the second network processor, (n) formatting the frame, (o) determining the egress port for transmission of the frame, (p) queuing the frame for transmission from the egress port, and (l) transmitting the frame from the egress port to a destination.

BRIEF DESCRIPTION OF THE DRAWINGS

A more complete understanding of the present disclosure and advantages thereof may be acquired by referring to the following description taken in conjunction with the accompanying drawings, wherein.

Figure 1:
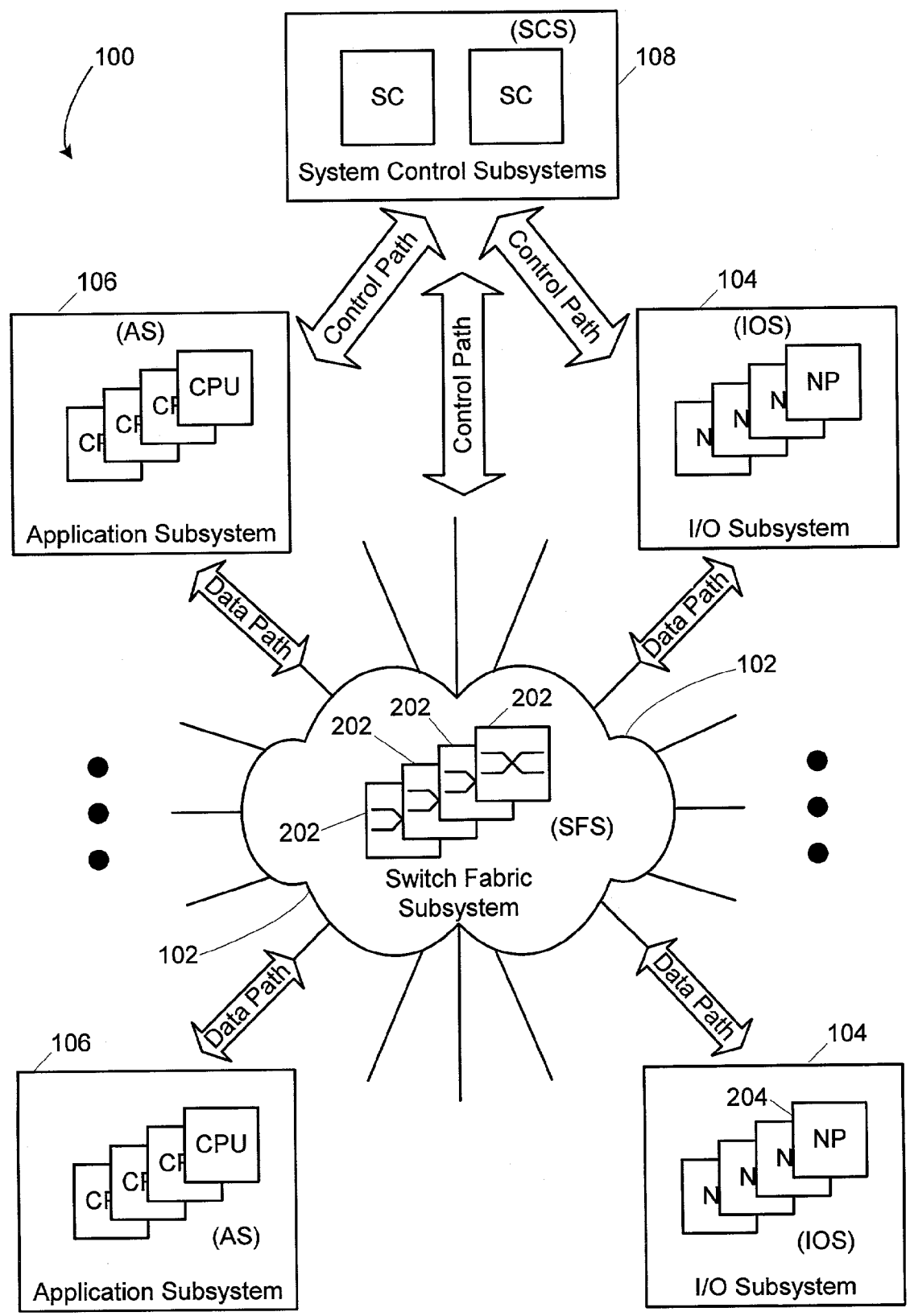
FIG. 1 is a conceptual schematic system architecture of a Storage Network Switch.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EXEMPLARY EMBODIMENTS

The present invention is directed to a system and method of implementing a Fibre Channel protocol using a system architecture comprising a network processor(s) controlled by software to implement a plurality of upper and lower layer protocols without requiring specialized hardware design or changes. The present invention utilizes the software program(s) running on the network processor(s) to implement, for example but not limited to, the FC-1 and FC-2 layer functions that were typically done with a specific dedicated purpose Fibre Channel ASIC.

A network processor (NP) or Network Processing Unit (NPU) is a device that may be software programmed for the functionality of communication data forwarding. The NPU may be programmed for all levels of the communications protocol stack, e.g., from Layer 2 through Layer 7. In the NPs the packet and cell data handling are managed through micro-engine RISC cores operating with a data-flow architecture. The RISC cores may be programmed in C and may provide complete access to any information necessary to make forwarding decisions without being burdened down with the tasks of packet parsing and data manipulation. The programmable elements inside of a NPU are not constructed to handle specific protocols, but instead provide primitives that allow any protocol to be processed or extended. This universal programmability allows protocol support that can include packets, cells, and data streams (separately or in combination) across various interface requirements. Dedicated coprocessors may be shared by all NPs. These coprocessors may be used for table searches, buffer management and queue management.

The following description of an exemplary embodiment of the present invention contains a number of technical terms using abbreviations and/or acronyms which are defined herein and used hereinafter:

| | |
|---|---|
| AS | Application Subsystem |
| BMU | Buffer Management Unit |
| CP | Channel Processor |
| De-Mux | De-Multiplexer |
| DMA | Direct Memory Access |
| FC | Fibre Channel |
| FP | Fabric Processor |
| I/O | Input-Output |
| IOS | I/O Subsystem |
| LCP | Line Card Processor |
| Mux | Multiplexer |
| NAK | Negative-Acknowledge Character |
| NP | Network Processor(s) |
| PCI | Peripheral Component Interconnect |
| QMU | Queue Management Unit |
| RISC | Reduced Instruction Set Computer |
| SCP | System Control Processor |
| SCS | System Control Subsystem |
| SDP | Serial Data Processor |
| SFS | Switch Fabric Subsystem |
| TLU | Table Lookup Unit |
| XP | Executive Coprocessor |

Referring now to the drawings, the details of a specific exemplary embodiment of the invention is schematically illustrated. Like elements in the drawings will be represented by like numbers, and similar elements will be represented by like numbers with a different lower case letter suffix.

FIG. 1 illustrates a conceptual schematic system architecture of a Storage Network Switch. The Storage Network Switch, generally represented by the numeral 100, comprises: 1) a Switch Fabric Subsystem (SFS) 102, 2) I/O Subsystems (IOSs) 104, 3) Application Subsystems (ASs) 106, and 4) System Control Subsystems (SCSs) 108. The SFS 102 is a protocol agnostic cell or packet switching infrastructure that provides the high performance and highly scalable interconnections between the IOSs 104 and ASs 106. It provides primary data paths for network traffic being moved by the Storage Network Switch 100. The IOSs 104 provide the actual port connectivity to the external network devices that use the Storage Network Switch 100 to communicate with other external network devices (not illustrated). The IOSs 104 are part of the data path and are responsible for making the high performance, low level decoding of ingress frames from the external ports, switching/routing and identifying the destination IOS 104 for the frame, and queuing the frame for transmission through the SFS 102. The IOSs 104 process packets at the very lowest protocol levels (Data Link and Network Layer of the OSI Model) where fast switching and routing decisions can be made. An IOS 104 may be comprised of a plurality of Network Processors (NPs) 204 coupled to external network devices (not illustrated).

The ASs 106 provide higher level processing of frames and data streams in the Storage Network Switch 100. The ASs 106 have more advanced programmability and functionality than the IOSs 104, but rely on the control and data information provided by the IOSs 104 to maintain high performance packet throughput. Typical applications that can run on the ASs 106 are caching, storage virtualization, file serving, and high level protocol conversion. The SCSs 108 provide the overall management of the Storage Network Switch 100. Most of the low level switching and routing protocol functions are executed on the SCSs 108. In addition, management access functions such as an SNMP agent, web server, telnet server, and a direct command line interface may reside on the SCSs 108. The hardware and software executing on the SCSs 108 are responsible for managing the other subsystems (102, 104, 106) in the Storage Network Switch 100.

Figure 2:
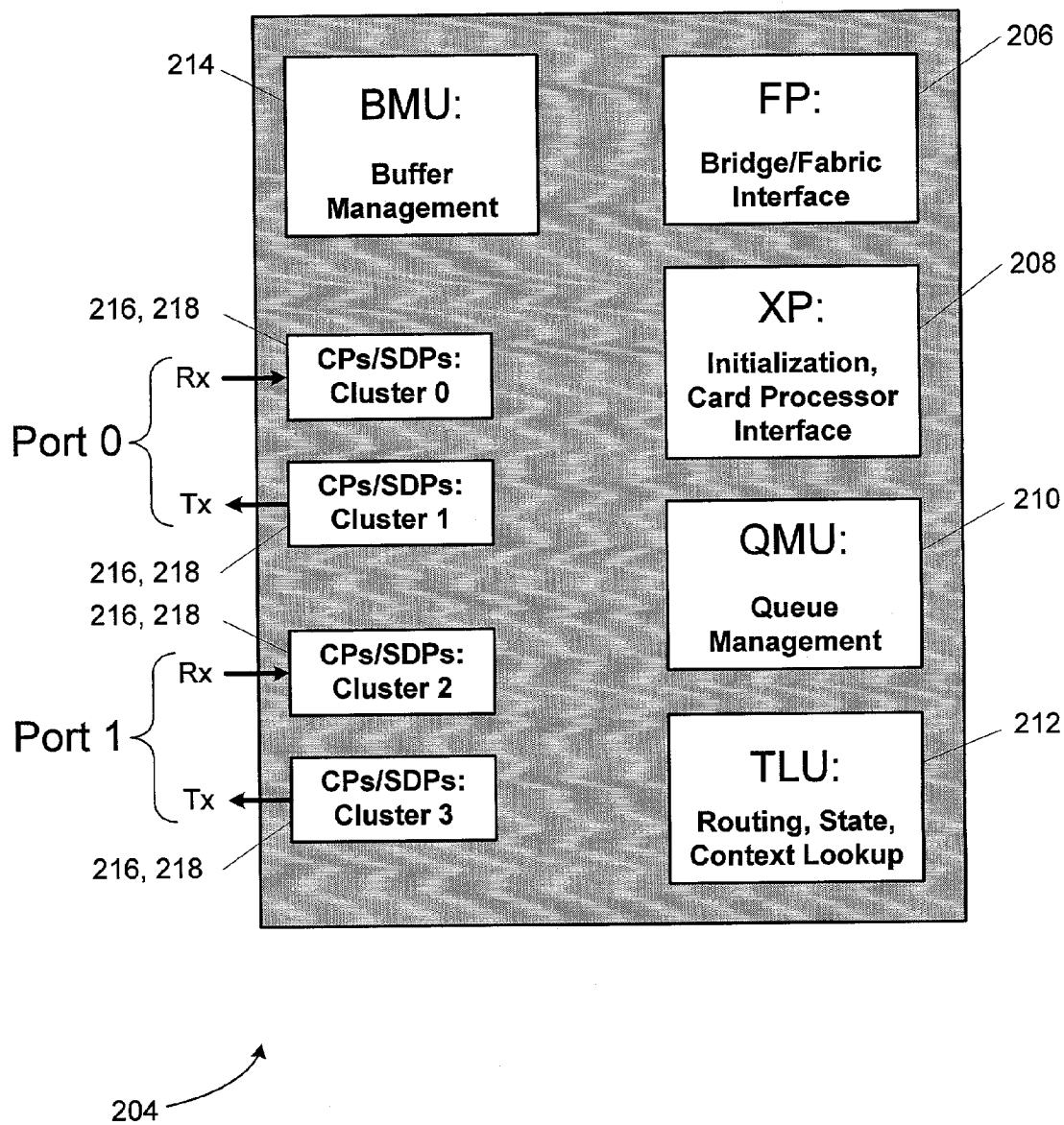
FIG. 2 is a schematic block diagram of a Network Processor.

Referring now to FIG. 2, a schematic block diagram of a network processor (NP) 204 is illustrated, according to an exemplary embodiment of the invention. The Network Processor 204 comprises a fabric processor (FP) 206, an executive processor (XP) 208, channel processors (CPs) 216, and associated serial data processors (SDP) 218 for each of the CPs 216 (included in each cluster). The CPs 216 may be C programmable RISC cores that can be used to handle FC-2 functions. The serial data processors 218 may be microcode programmable and handle data encoding/decoding, framing, formatting, parsing, error checking (CRCs), and data movement. The serial data processors 218 also control programmable external pin logic, allowing them to implement any Layer 1 interface (hardware), including Gigabit Ethernet and Fibre Channel. It is this flexibility that is exploited to implement the low-level Fibre Channel protocol functions, according to the present invention.

The channel processors 216 and the associated serial data processors 218 may be aggregated into clusters to provide sufficient processing power for the Fibre Channel protocol and, for example, to handle a gigabit per second physical interface. Within each cluster there may be four channel processors 216a-216d and four serial data processors 218a-218d grouped together, each dedicated to perform either the receive function or the transmit function. The aggregated processors (216, 218) in a cluster may share the same code but can have separate variable space so the code preferably executes independently to achieve a pipelining effect during the data processing. It is contemplated and within the scope of the invention that any number of channel processors 216 and serial data processor 218 may be grouped in a cluster.

The executive processor (XP) 208 may perform initialization, interfacing with a general-purpose host processor, and other management functions. The fabric processor (FP) 206 may be used for interfacing to the switch fabric subsystem (SFS) 102, segmentation and framing conforming to the switch fabric interface in the SFS 102, and flow control for switch fabric frames to and from the SFS 102. The table lookup unit (TLU) 212 may be used for any complex table lookup, state lookup to assists the operation of software state machines, and sequence/exchange context lookup for protocol processing. The buffer management unit (BMU) 214 and queue management unit (QMU) 210 perform typical functions of buffer and queue management, respectively. The network processor software may be partitioned into the following modules.

Figure 3:
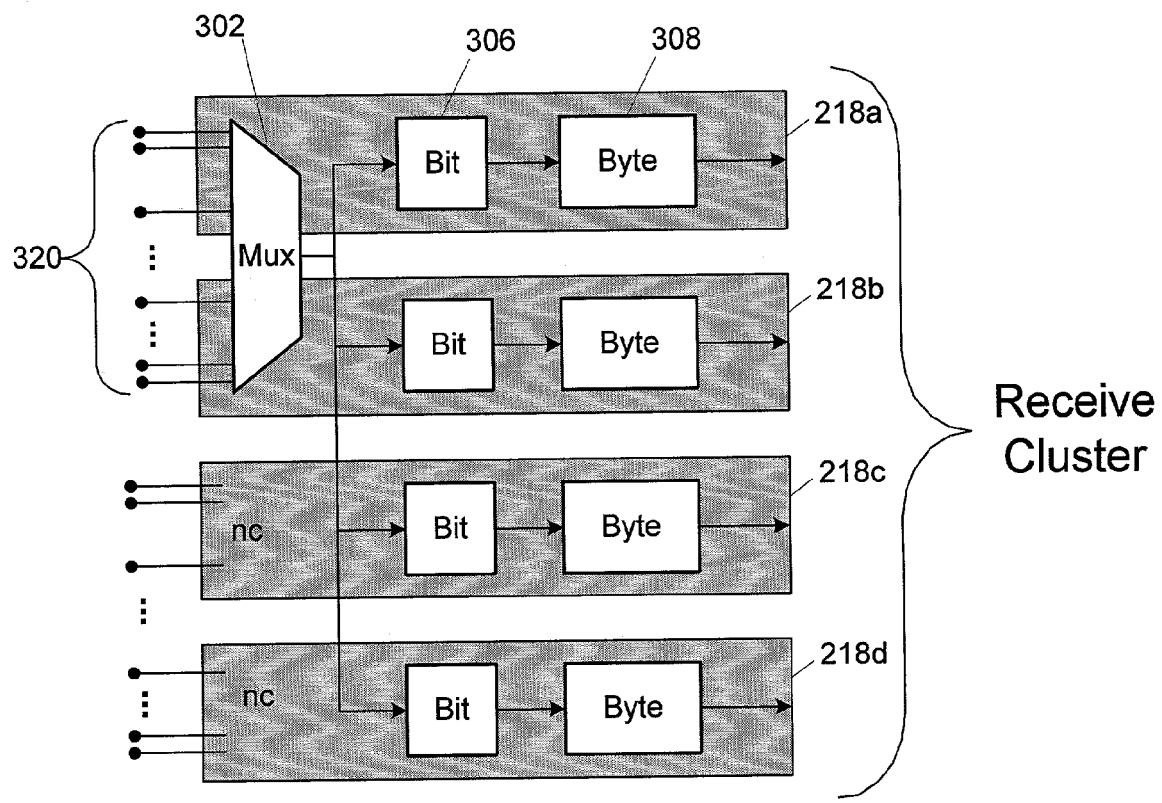
FIG. 3 is a schematic block diagram of a receive cluster.
Figure 4:
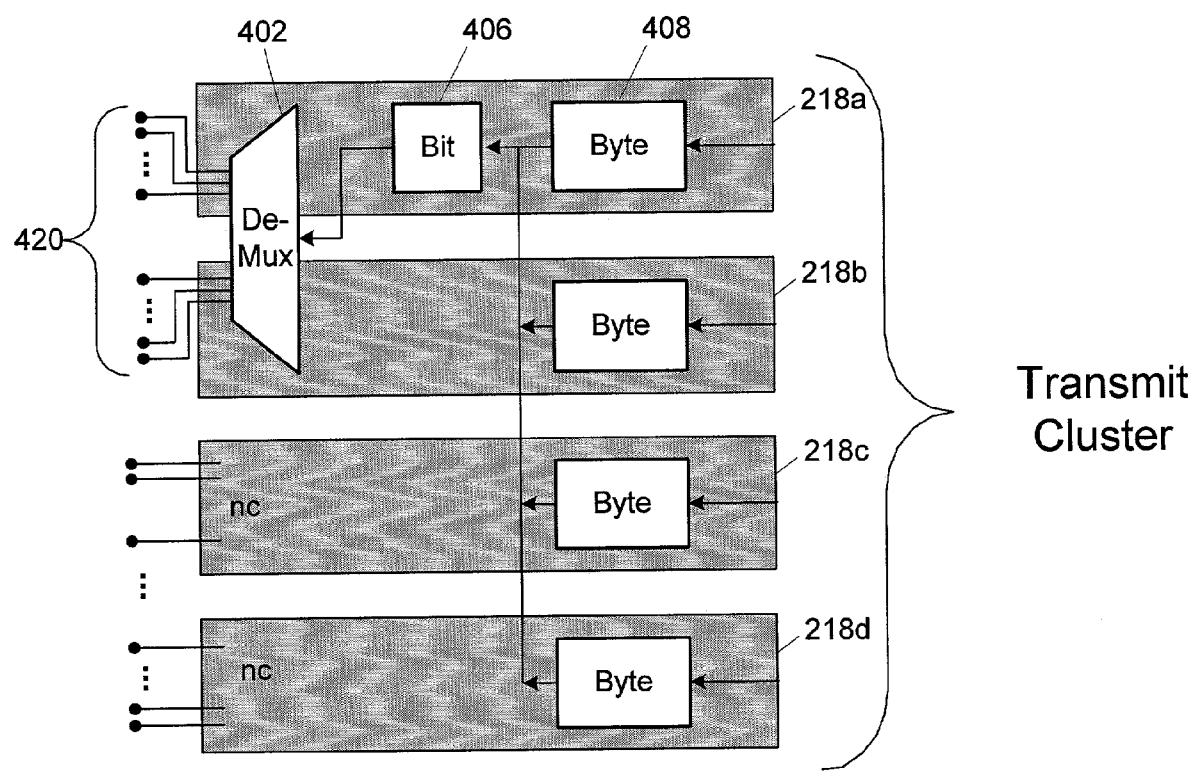
FIG. 4 is a schematic block diagram of a transmit cluster.

Executive Processor (XP)
XP Initialization Code
XP Runtime Code
Channel Processors and Serial Data Processors (CPs and SDPs)
Low-level receive-processing Microcode
Low-level transmit-processing Microcode
RISC Core Receive Processing Code
RISC Core Transmit Processing Code
Fabric Processor (FP)
RxFP Receive Engine Microcode
TxFP Transmit Engine Microcode Referring to FIGS. 3 and 4, depicted are schematic block diagrams of receive and transmit clusters, respectively, according to an exemplary embodiment of the invention. Each receive cluster (FIG. 3) comprises a multiplexer (Mux) 302, and a plurality of serial data processors 218a-218d. Each serial data processor 218 comprises an RxBit subprocessor 306 and an RxByte subprocessor 308. Each Transmit cluster (FIG. 4) comprises a de-multiplexer (De-Mux) 402, and a plurality of serial data processors 218a-218d. Each serial data processor 218 comprises an a TxByte subprocessor 408. The channel bit and byte subprocessors making up the serial data processors 218 are used for low-level manipulation of the data stream as well as CRC validation and generation. In addition, the serial data processors 218 communicate with the core processor status code, transmit instructions, and extracted headers.

Figure 5:
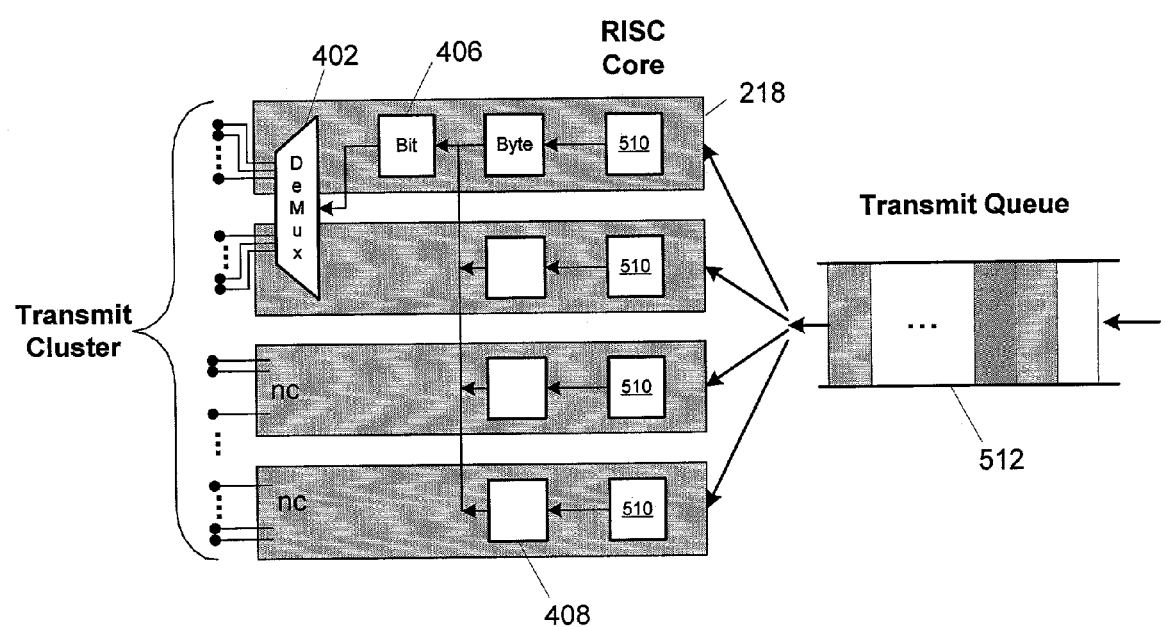
FIG. 5 is a schematic block diagram of a transmit cluster having RISC cores accepting transmit queue data flow.

Referring to FIG. 5, depicted is a schematic block diagram of a transmit cluster having channel RISC cores 510 accepting transmit queue data flow, according to the exemplary embodiment of the invention. The channel RISC cores 510 have access to event timers, cycle timers, interrupts, and DMA to/from external memory, the TLU 212 and QMU 210 (FIG. 2). The RISC cores 510 may be used for forwarding decisions targeting either the executive processor (XP) 208 or the switch fabric subsystem (SFS) 102, the RISC cores 510 may also keep track of statistics and error handling in the data path (e.g., from the transmit queue 512).

During initialization of the Storage Network Switch 100, a primary function of the XP 208 is network processor boot and code download. When the Network Processors 204 are taken out of reset, the XP 208 is the first processor to load and execute its program. A boot loader within XP 208 may also be used for reading a network processor code package and then loading the program into the instruction and data memories of all the channel processor RISC cores 510 and serial data processors 418. Additionally, XP 208 may distribute data from the package to Content Addressable Memories (CAMs) (not shown) and instruction storage for all the logic within the channel processors (CPs 216) and the fabric processor (FP) 206.

Figure 7:
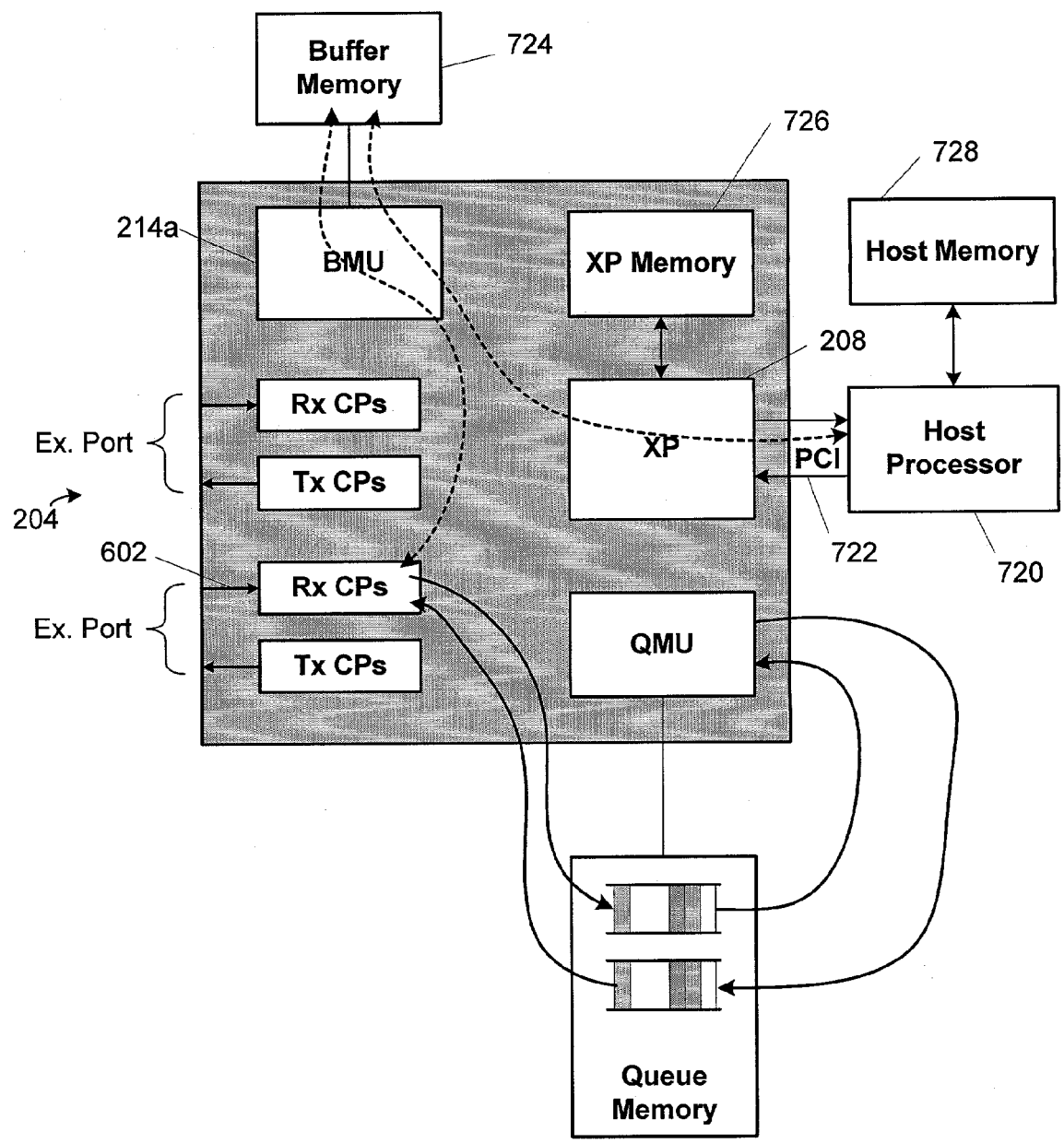
FIG. 7 is a schematic block diagram illustrating data flow for switch services.

Referring now to FIG. 7, depicted is a schematic block diagram illustrating data flow for switch services, according to an exemplary embodiment of the invention. During operation of the Storage Network Switch 100, the XP 208 moves switch service data frames between the Network Processors 204 and a general-purpose host processor 720 through a data transfer interface, e.g., a PCI interface 722. Received data may be moved from a buffer memory 724 to a local XP data memory 726 and then forwarded to the host processor memory 728 over the PCI interface 722. An XP 208 may also be configured for performing read and write memory-mapped transactions over the PCI bus 722 for short data accesses. Besides the task of communicating with the host processor 720, the XP 208 may also perform management functions of the Network Processors 204.

Referring back to FIG. 3, two channel processor pin sets 320 may be used to provide a hardware interface, e.g., ten-bit interface. Data bits from each of the pin sets 320 may be multiplexed serially through the 10-bit/8-bit decoder and passed to the serial data processors 218. Although the receiver pin sets 320 of only two of the channel processors 216 are physically connected, received frames may be distributed evenly among the four channel processors 216 to share the receive cluster's memory space and processing power. Hardware tokens may operate at the serial data processor (SDP) 218 levels to forward a consistent stream of data at a frame boundary. A software token may also implemented in the channel RISC cores 510 to serialize the sequencing of frames to the Fabric Processor (FP) 206 so as to maintain the original frame order.

Referring back to FIGS. 4 and 5, for transmission, four channel processors may be aggregated to share a cluster's memory space and processing power. Transmit processing may be evenly distributed among the four channel RISC cores 510 and serial data processors 218. Outgoing frames may be queued to the channel processors 216. The four channel processors 216 (in a cluster may be configured to share one single transmit queue 512. A software token can be maintained to serialize the dequeueing of transmit tasks for the four RISC cores 510. A hardware token may be used to serialize the forwarding of data bits from the TxByte processors 408 to a single TxBit processor 406 in the cluster. This single TxBit processor 406 passes the data bits to the demultiplexer 402, e.g., an 8-bit/10-bit demux connected to 10 physical output pins.

Figure 6:
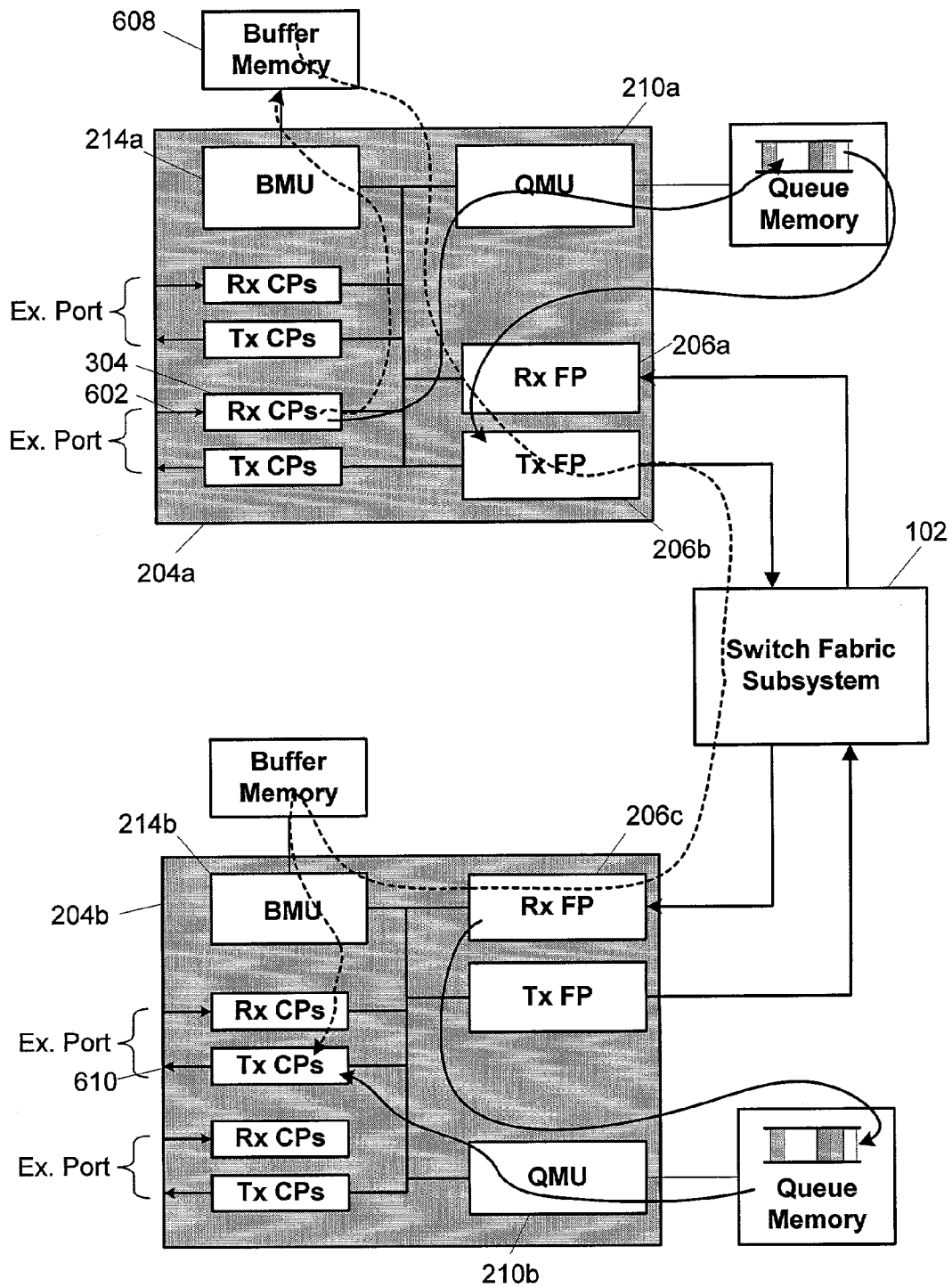
FIG. 6 is a schematic block diagram illustrating Fibre Channel frame data flow.

Referring now to FIG. 6, depicted is a schematic block diagram illustrating Fibre Channel frame data flow, according to an exemplary embodiment of the invention. As a data stream 602 is received by the serial data processor 218, the FC frame header is extracted. Simultaneously, the header as well as the data payload (604) is sent to the buffer management unit (BMU) 214a for storage in external buffer memory 608. Based on the extracted R_CTL, D_ID, and TYPE fields in the header, the channel RISC core 510 classifies the frame. For class 2 and 3 device data frames not targeting any of the well-known switch service servers within the system, the channel processor 216 queues the frames to the fabric processor 206 transmit engine. Detecting that a queue assigned to the fabric processor (FP) 206 has become non-empty, the fabric processor (FP) 206 dequeues the next descriptor from the queue management unit (QMU) 210, performs the necessary switch fabric framing and forwards the frame to the destination switch fabric subsystem (SFS) 102 port.

As soon as processing control of a frame is passed from a serial data processor 218 to the channel processor RISC core 510, the serial data also passes the receive token to the next serial data processor 218 in the cluster. This allows the receive frame processing to proceed in a pipelining fashion in which the next serial data processor will process the next received frame while routing decision and Fibre Channel zone enforcement is being performed in the current channel processor RISC core 510.

At the destination network processor 204b, the receive fabric processor 206c extracts the header and reassembles the data payload and sends it to the buffer management unit 214b for buffering. By examining the header, the fabric processor 206 determines the correct output channel processor cluster and queues the frame for transmission. Finally, the channel processor 216 within that cluster dequeues the transmit request and sends the frame out the output port. A similar pipelined processing is performed whereby the channel processor RISC core also passes the token to the next processor RISC core as soon as the transmit control of a frame has been passed to the serial data processor. This allows the next transmit processing to occur in the next RISC core while the current serial data processor streams the data out the physical output port 610.

Referring now to FIG. 7, depicted is a schematic block diagram illustrating data flow for switch services, according to an exemplary embodiment of the invention. To support switch services such as the Fibre Channel simple name server, alias server, etc., link control and other non-time-critical frames requiring a more intensive processing are routed to the executive processor to be forwarded to the host processor. The network processor configures the PCI space so data payload can be (direct-memory-accessed) DMA by hardware to and from the host processor 720 while doorbell signals and other small control information may be directly read and written via program I/O to the PCI space.

Figure 8:
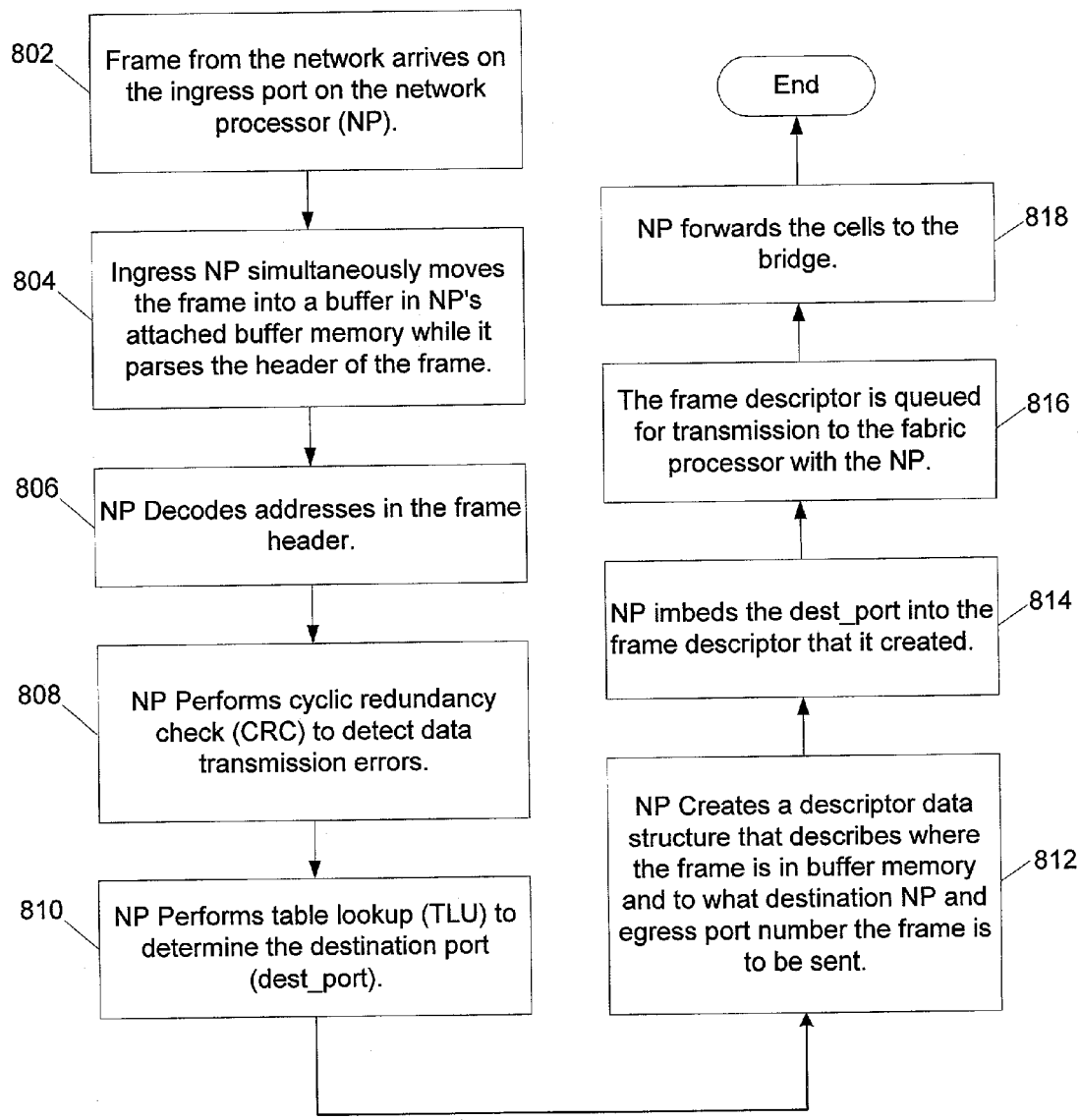
FIG. 8 is a flow chart of ingress data flow for Fibre Channel implementation using network processors.

Referring to FIG. 8, depicted is a flow chart of ingress data flow for Fibre Channel implementation using network processors. In step 802, a frame from the network is received at an ingress port of a network processor. The ingress port is coupled to a network. In step 804, the network processor moves the frame into a buffer memory coupled to the network processor and the network processor contemporaneously parses the header of the frame. In step 806, the network processor decodes addresses in the frame header. The network processor performs a cyclic redundancy check (CRC) in step 808 to detect if there were any transmission errors. In step 810, the network processor performs a table lookup (TLU) to determine the destination port (dest_port). In step 812, the network processor creates a descriptor data structure that describes where the frame is in buffer memory, and to what destination network processor and egress port number the frame is to be sent. In step 814, the network processor imbeds the dest_port into the frame descriptor that it created. In step 816, the frame descriptor is queued for transmission to the fabric processor associated with the network processor handling the frame. In step 818, the network processor forwards the frame cells to the switch fabric interface bridge until all cells have been forwarded.

Figure 9:
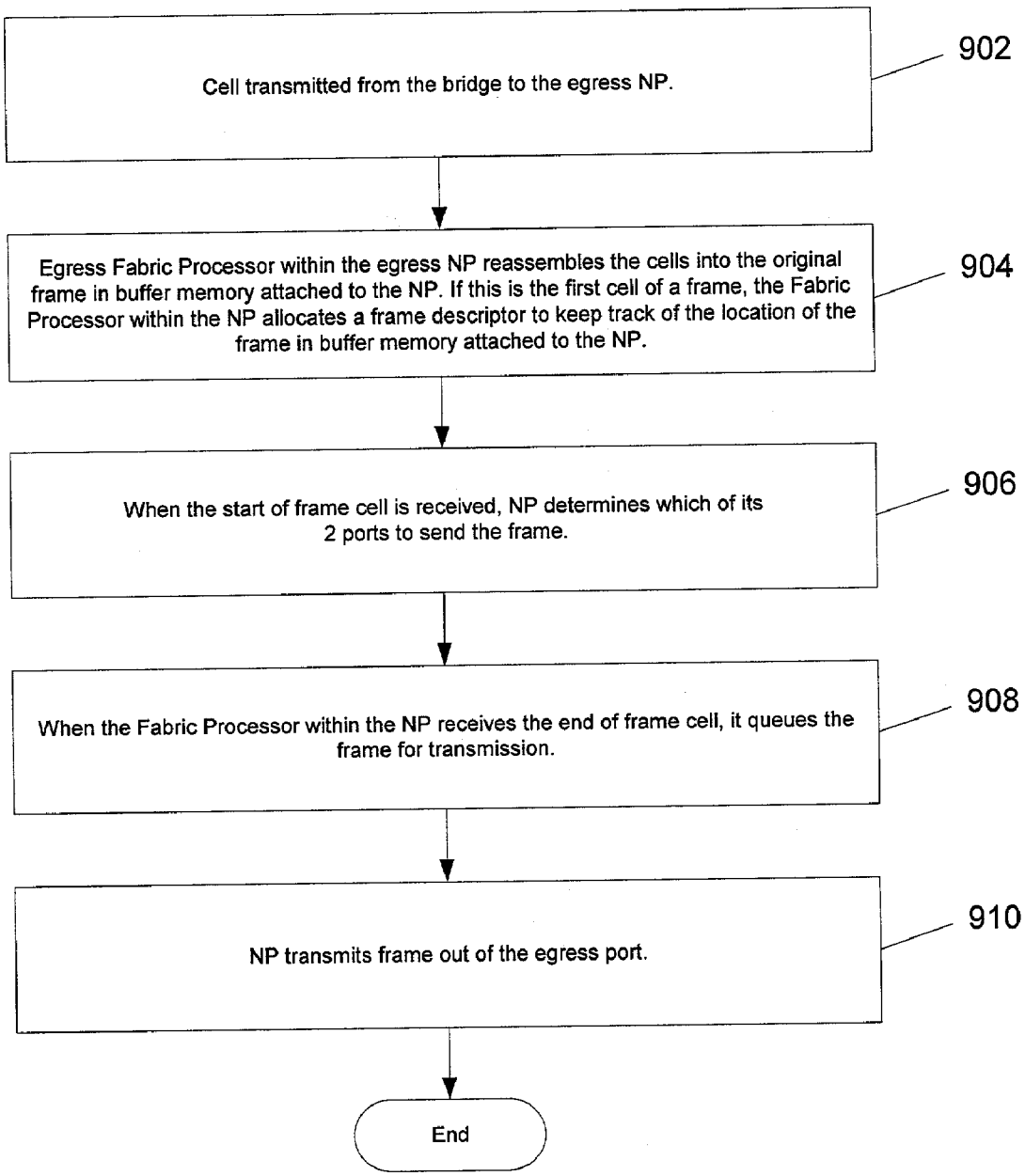
FIG. 9 is a flow chart of egress data flow for Fibre Channel implementation using network processors.

Referring to FIG. 9, depicted is a flow chart of egress data flow for Fibre Channel implementation using network processors. In step 902, an egress network processor receives cells from an associated switch fabric interface bridge. In step 904, an egress fabric processor associated with the egress network processor reassembles the cells into the original frame and stores the frame in buffer memory coupled to the egress network processor. If this is the first cell of a frame, the fabric processor, associated with the egress network processor, allocates a frame descriptor to keep track of the location of the frame in buffer memory coupled to the egress network processor. In step 906, when the start of frame cell is received, the egress network processor determines which of its 2 ports to send the frame. In step 908, when the fabric processor, associated with the egress network processor, receives the end of frame cell, it queues the frame for transmission. In step 910, the egress network processor transmits the frame out of the egress port.

Figure 10:
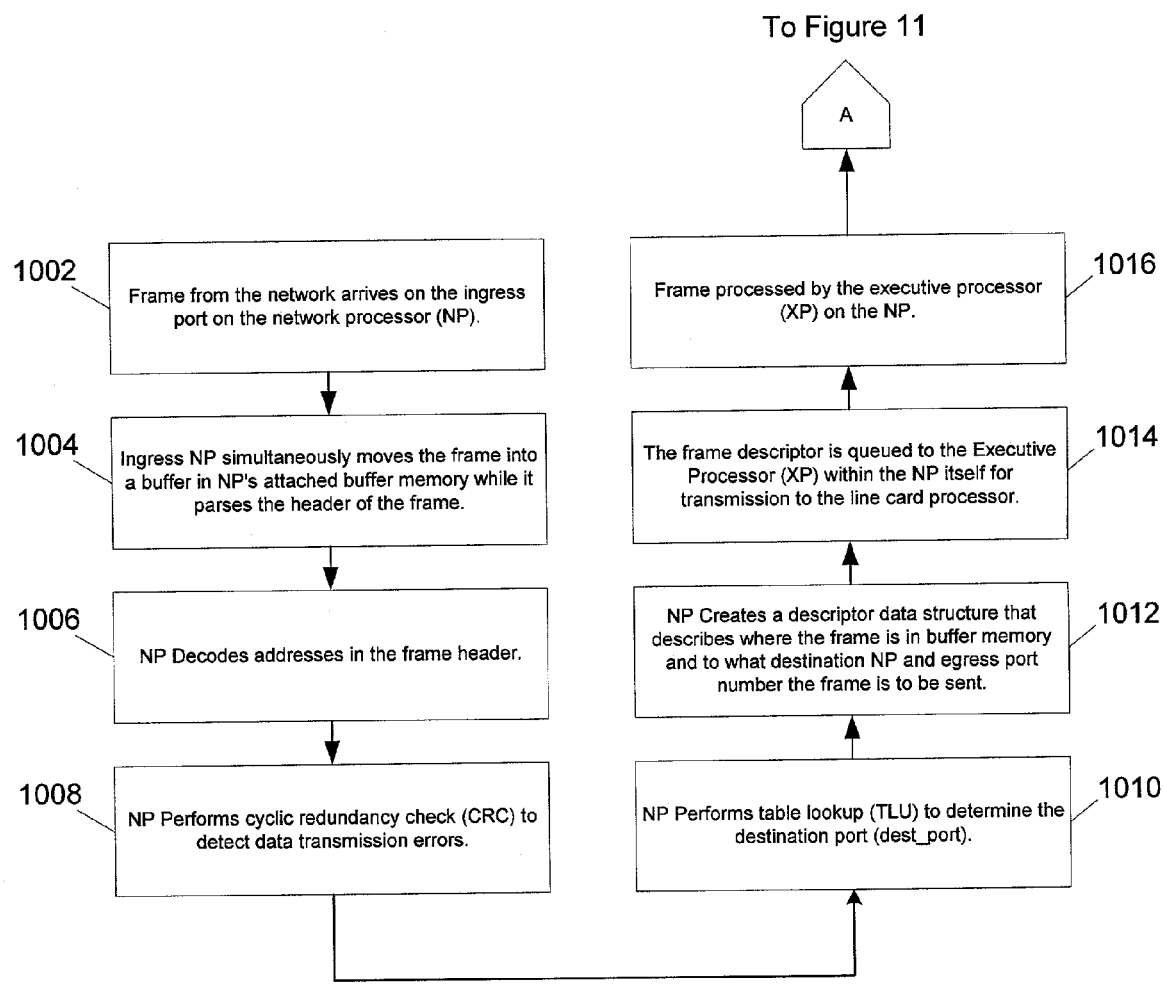
FIGS. 10 and 11 are a flow chart of ingress control flow for Fibre Channel implementation using network processors.
Figure 11:
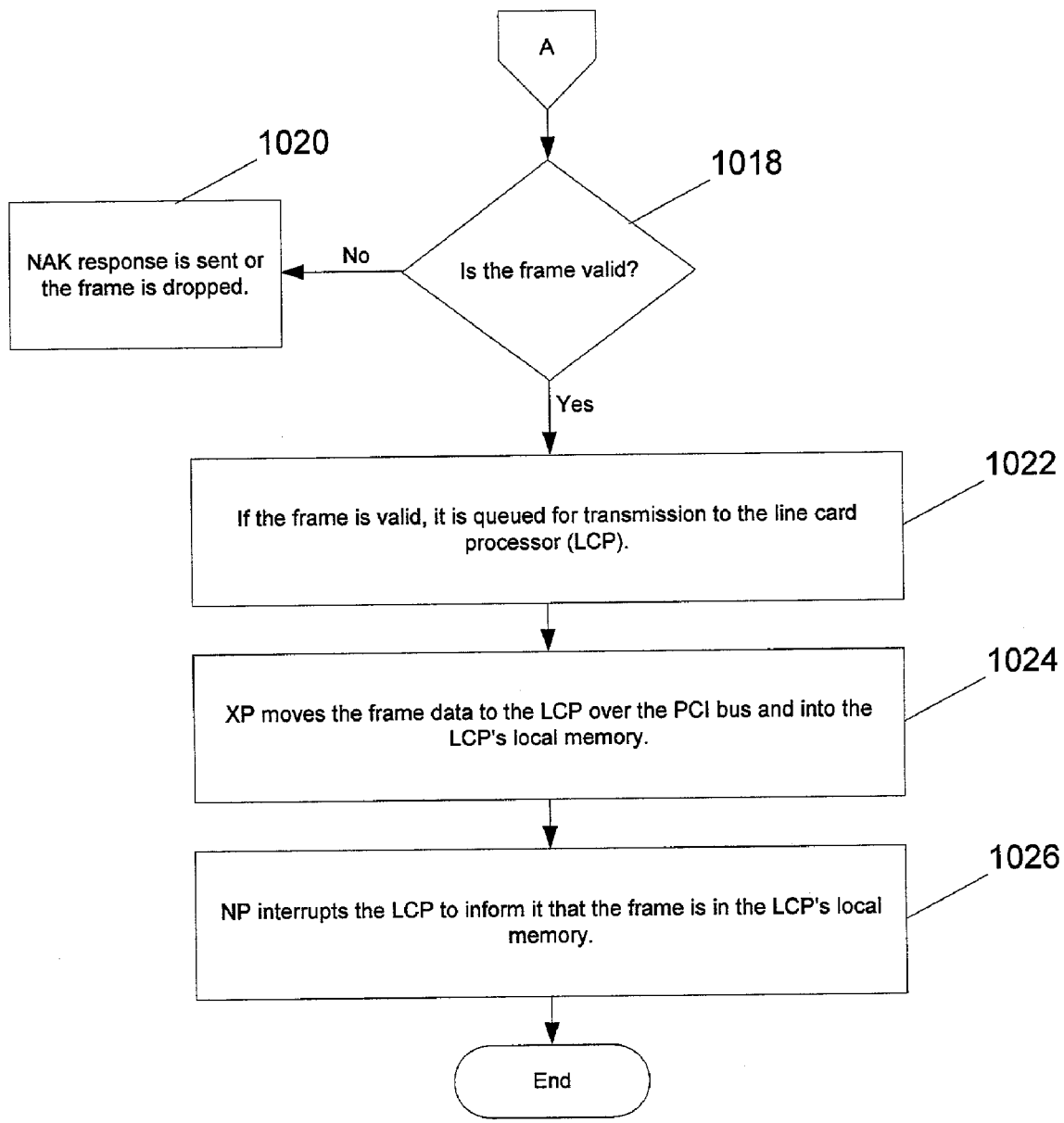

Referring to FIGS. 10 and 11, depicted is a flow chart of ingress control flow for Fibre Channel implementation using network processors. In step 1002, a frame from the network is received at an ingress port of a network processor. The ingress port is coupled to a network. In step 1004, the network processor moves the frame into a buffer memory coupled to the network processor and the network processor contemporaneously parses the header of the frame. In step 1006, the network processor decodes addresses in the frame header. The network processor performs a cyclic redundancy check (CRC) in step 1008 to detect if there were any transmission errors. In step 1010, the network processor performs a table lookup (TLU) to determine the destination port (dest_port). In step 1012, the network processor creates a descriptor data structure that describes where the frame is in buffer memory and to what destination network processor and egress port number the frame is to be sent. In step 1014, the frame descriptor is queued to an executive processor within the network processor for transmission to a line card processor. In step 1016, the frame is processed by the executive processor. In step 1018, a determination is made whether the frame is valid. If not, a negative-acknowledge character (NAK) is sent or the frame is dropped in step 1020. If the frame is valid, then in step 1022, it is queued for transmission to the line card processor. In step 1024, the executive processor moves the frame data to the line card processor over a data bus, e.g., a PCI bus, and into local memory coupled to the line card processor. The network processor sends an interrupt to the line card processor to inform it that the frame is in the local memory of the line card processor.

Figure 12:
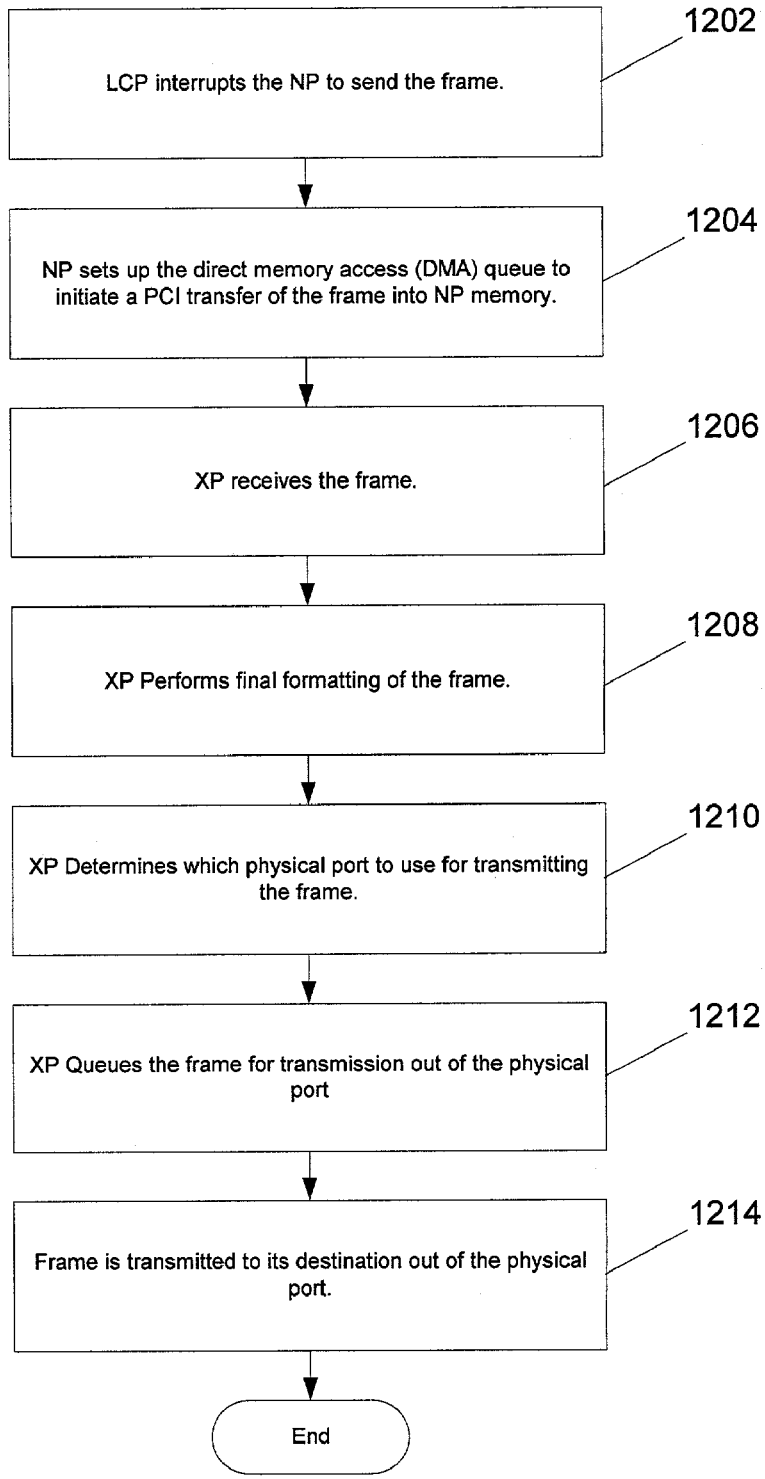
FIG. 12 is a flow chart of egress control flow for Fibre Channel implementation using network processors.

Referring to FIG. 12, depicted is a flow chart of egress control flow for Fibre Channel implementation using network processors. In step 1202, line card processor interrupts the network processor to send the frame. In step 1204, the network processor sets up the direct memory access (DMA) queue to initiate a transfer, e.g., over a PCI bus, of the frame into the network processor memory. In step 1206, the executive processor receives the frame and in step 1208 the executive processor does the final formatting of the frame. In step 1210, the executive processor determines which physical port to use for transmitting the frame. In step 1212, the executive processor queues the frame for transmission from that physical port. In step 1214, the frame is transmitted to its destination from the physical port.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for Fibre Channel ingress data flow with network processors, said method comprising the steps of:
   receiving a frame from a network;
   moving the frame into a buffer memory;
   parsing the frame header;
   decoding addresses in the frame header;
   performing a cyclic redundancy check on the frame for detecting transmission errors;
   performing a table lookup for determining a destination port;
   creating a frame descriptor having a data structure describing where the frame is stored in the buffer memory and to what egress port number the frame is to be sent;
   imbedding the destination port into the frame descriptor;
   queuing the frame descriptor for transmission to a fabric processor; and
   forwarding cells of the frame to a switch fabric interface bridge.

2. The method according to claim 1, wherein the step of receiving a frame comprises the step of receiving a frame at an ingress port of an ingress network processor, the ingress port being coupled to the network.

3. The method according to claim 2, wherein the fabric processor is associated with the ingress network processor.

4. The method according to claim 2, wherein the buffer memory is coupled to the ingress network processor.

5. The method according to claim 2, wherein the ingress network processor is a plurality of ingress network processors.

6. The method according to claim 5, wherein the plurality of ingress network processors are arranged in a cluster for sharing operational activities.

7. The method according to claim 6, wherein the step of sharing operational activities includes the step of pipelining operational activities.

8. A method for Fibre Channel egress data flow with network processors, said method comprising the steps of:
   receiving cells of a frame from a switch fabric interface bridge;
   reassembling the frame from the received cells and storing the frame in a buffer memory, wherein when a first cell of the frame is received a frame descriptor is allocated for keeping track of the frame location in the buffer memory;
   determining which port to send the frame upon receiving a start of frame cell;
   queuing the frame for transmission when an end of frame cell is received; and
   transmitting the frame from the port.

9. The method according to claim 8, wherein the step of reassembling the frame from the received cells comprises the step of reassembling the frame with an egress fabric processor associated with an egress network processor.

10. The method according to claim 9, wherein the buffer memory is coupled to the egress network processor.

11. The method according to claim 9, wherein the step of queuing the frame for transmission is done with the egress fabric processor.

12. The method according to claim 9, wherein the egress network processor is a plurality of egress network processors.

13. The method according to claim 12, wherein the plurality of egress network processors are arranged in a cluster for sharing operational activities.

14. The method according to claim 13, wherein the step of sharing operational activities includes the step of pipelining operational activities.

15. A method for Fibre Channel ingress control flow with network processors, said method comprising the steps of:
   (a) receiving a frame from a network;
   (b) moving the frame into a buffer memory;
   (c) parsing the frame header;
   (d) decoding addresses in the frame header;
   (e) performing a cyclic redundancy check on the frame for detecting transmission errors;
   (f) performing a table lookup for determining a destination port;
   (g) creating a frame descriptor having a data structure describing where the frame is stored in the buffer memory and to what egress port number the frame is to be sent;
   (h) queuing the frame descriptor for sending to a line card processor;

(i) processing the frame, wherein,
  (1) if the frame is valid, then queuing the frame for transmission to the line card processor and then going to step (j),
  (2) if not, then sending a negative-acknowledge character or dropping the frame, and then terminating ingress control flow for that frame;
(j) moving the frame data to a local memory of the line card processor; and
(k) notifying the line card processor that the frame is in the line card processor local memory.

16. The method according to claim 15, wherein the step of receiving a frame comprises the step of receiving a frame at an ingress port of an ingress network processor, the ingress port being coupled to the network.

17. The method according to claim 16, wherein the step of queuing the frame descriptor is the step of queuing the frame descriptor to an executive processor associated with the ingress network processor.

18. The method according to claim 17, where the step of processing the frame is done with the executive processor.

19. The method according to claim 17, where the step of moving the frame data is done with the executive processor.

20. The method according to claim 16, wherein the ingress network processor is a plurality of ingress network processors.

21. The method according to claim 20, wherein the plurality of ingress network processors are arranged in a cluster for sharing operational activities.

22. The method according to claim 21, wherein the step of sharing operational activities includes the step of pipelining operational activities.

23. A method for Fibre Channel data flow with network processors, said method comprising the steps of:
  receiving a frame from a network with a first network processor;
  moving the frame into a first buffer memory coupled to the first network processor;
  parsing the frame header with the first network processor;
  decoding addresses in the frame header with the first network processor;
  performing a cyclic redundancy check on the frame for detecting transmission errors with the first network processor;
  performing a table lookup for determining a destination port with the first network processor;
  creating a frame descriptor with the first network processor, the frame descriptor having a data structure describing where the frame is stored in the first buffer memory and to what egress port number the frame is to be sent;
  imbedding the destination port into the frame descriptor;
  queuing the frame descriptor for transmission to a fabric processor associated with the first network processor;
  forwarding cells of the frame to a switch fabric interface bridge with the first network processor;
  receiving cells of the frame from the switch fabric interface bridge with a second network processor;
  reassembling the frame from the received cells with the second network processor and storing the frame in a second buffer memory coupled to the second network processor, wherein when a first cell of the frame is received a frame descriptor is allocated for keeping track of the frame location in the second buffer memory;
  determining with the second network processor which port to send the frame upon receiving a start of frame cell;
  queuing the frame for transmission with the second network processor when an end of frame cell is received by the second network processor; and
  transmitting the frame with the second network processor from an egress port.

24. A method for Fibre Channel control flow with network processors, said method comprising the steps of:
  (a) receiving a frame from a network with a first network processor;
  (b) moving the frame into a buffer memory coupled to the first network processor;
  (c) parsing the frame header with the first network processor;
  (d) decoding addresses in the frame header with the first network processor;
  (e) performing a cyclic redundancy check with the first network processor on the frame for detecting transmission errors;
  (f) performing a table lookup with the first network processor for determining a destination port;
  (g) creating a frame descriptor with the first network processor, the frame descriptor having a data structure describing where the frame is stored in the first buffer memory and to what egress port number the frame is to be sent;
  (h) queuing the frame descriptor for sending to a line card processor;
  (i) processing the frame, wherein,
    (1) if the frame is valid, then queuing the frame for transmission to the line card processor and then going to step (j),
    (2) if not, then sending a negative-acknowledge character or dropping the frame, and then terminating ingress control flow for that frame;
  (j) moving the frame data to a local memory of the line card processor;
  (k) notifying the line card processor with the first network processor that the frame is in the line card processor local memory;
  (l) notifying a second network processor to send the frame;
  (m) transferring the frame into a local memory of the second network processor;
  (n) formatting the frame;
  (o) determining the egress port for transmission of the frame;
  (p) queuing the frame for transmission from the egress port; and
  (q) transmitting the frame from the egress port to a destination.

* * * * *